Jan. 13, 1953  A. D. LUND  2,625,223
AUTOMATIC PLATE TRIMMING MACHINE
Filed Oct. 17, 1946  8 Sheets-Sheet 1

INVENTOR.
ARTHUR D. LUND
BY
Carlsen + Hagh
ATTORNEYS

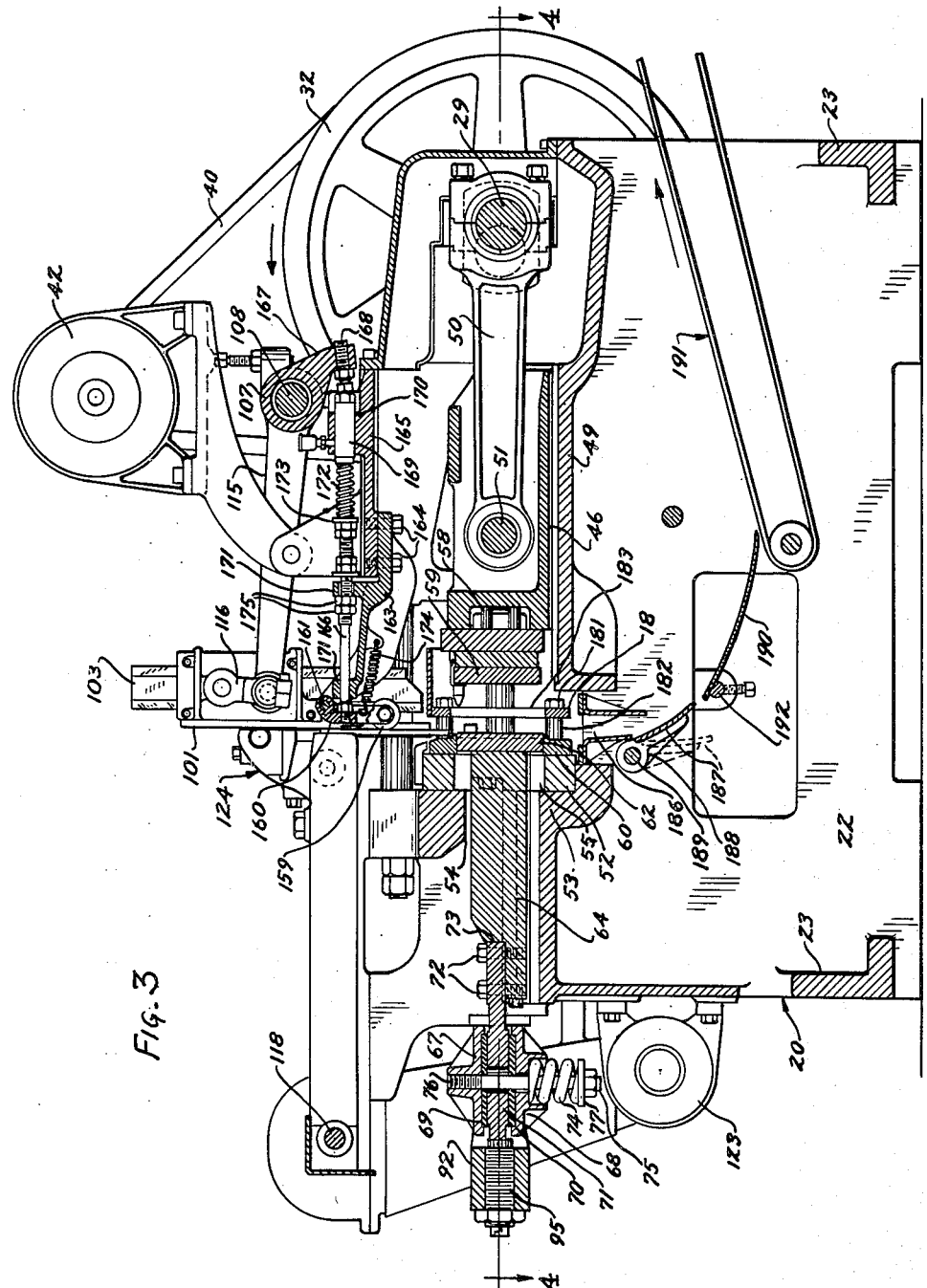

Jan. 13, 1953  A. D. LUND  2,625,223
AUTOMATIC PLATE TRIMMING MACHINE
Filed Oct. 17, 1946  8 Sheets-Sheet 4
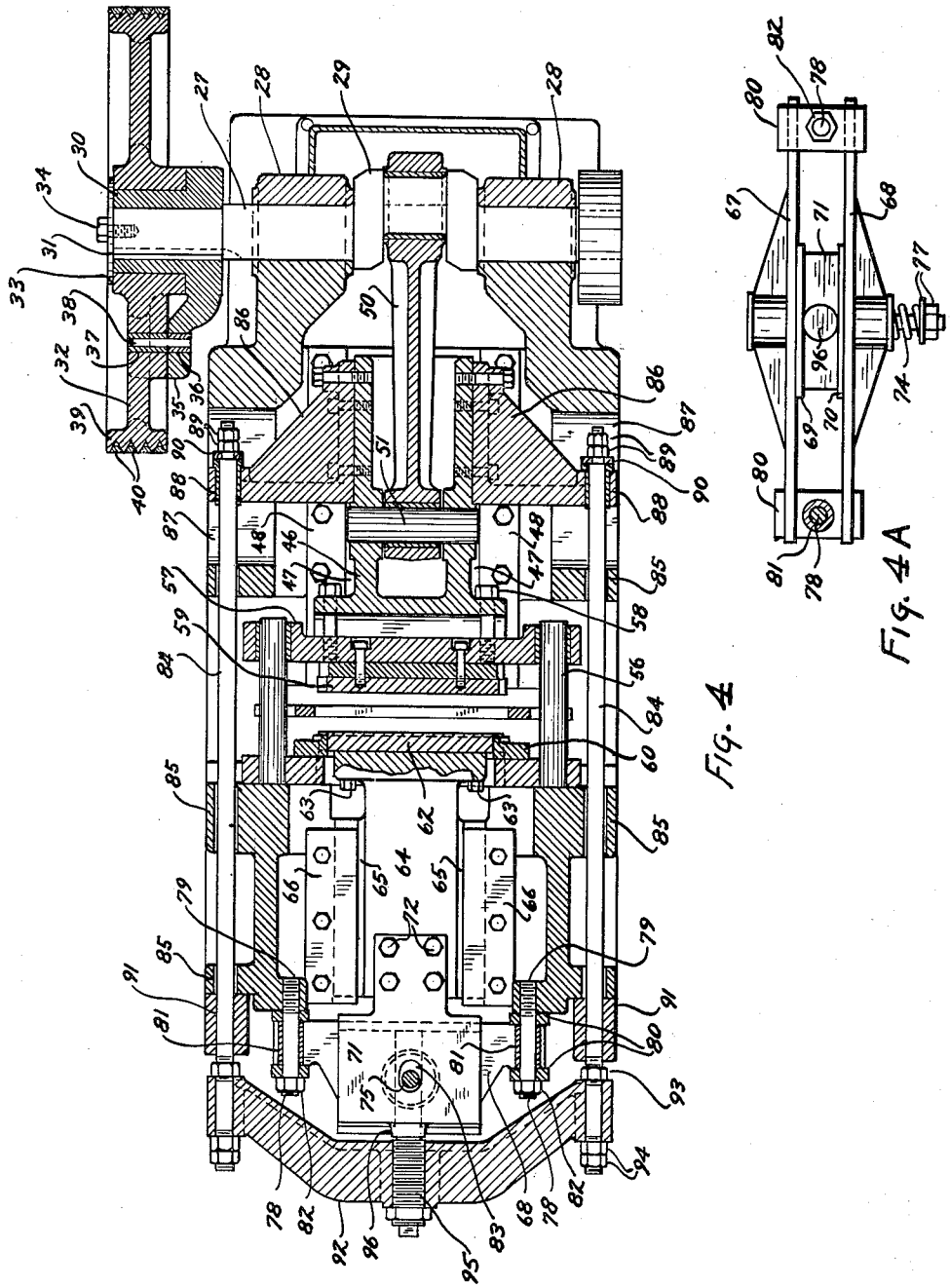
INVENTOR.
ARTHUR D. LUND
BY
Carlsen Hazle
ATTORNEYS

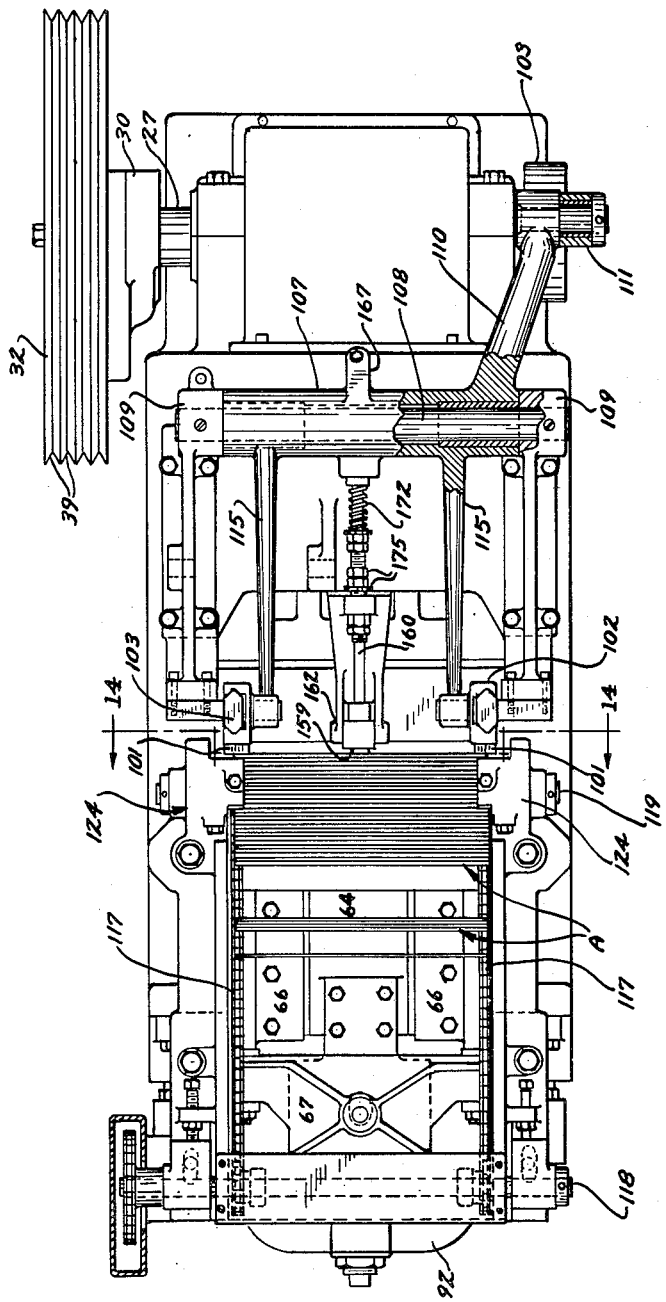

Jan. 13, 1953 A. D. LUND 2,625,223
AUTOMATIC PLATE TRIMMING MACHINE
Filed Oct. 17, 1946 8 Sheets-Sheet 6

INVENTOR.
ARTHUR D. LUND
BY
Carlsen + Hagle
ATTORNEYS

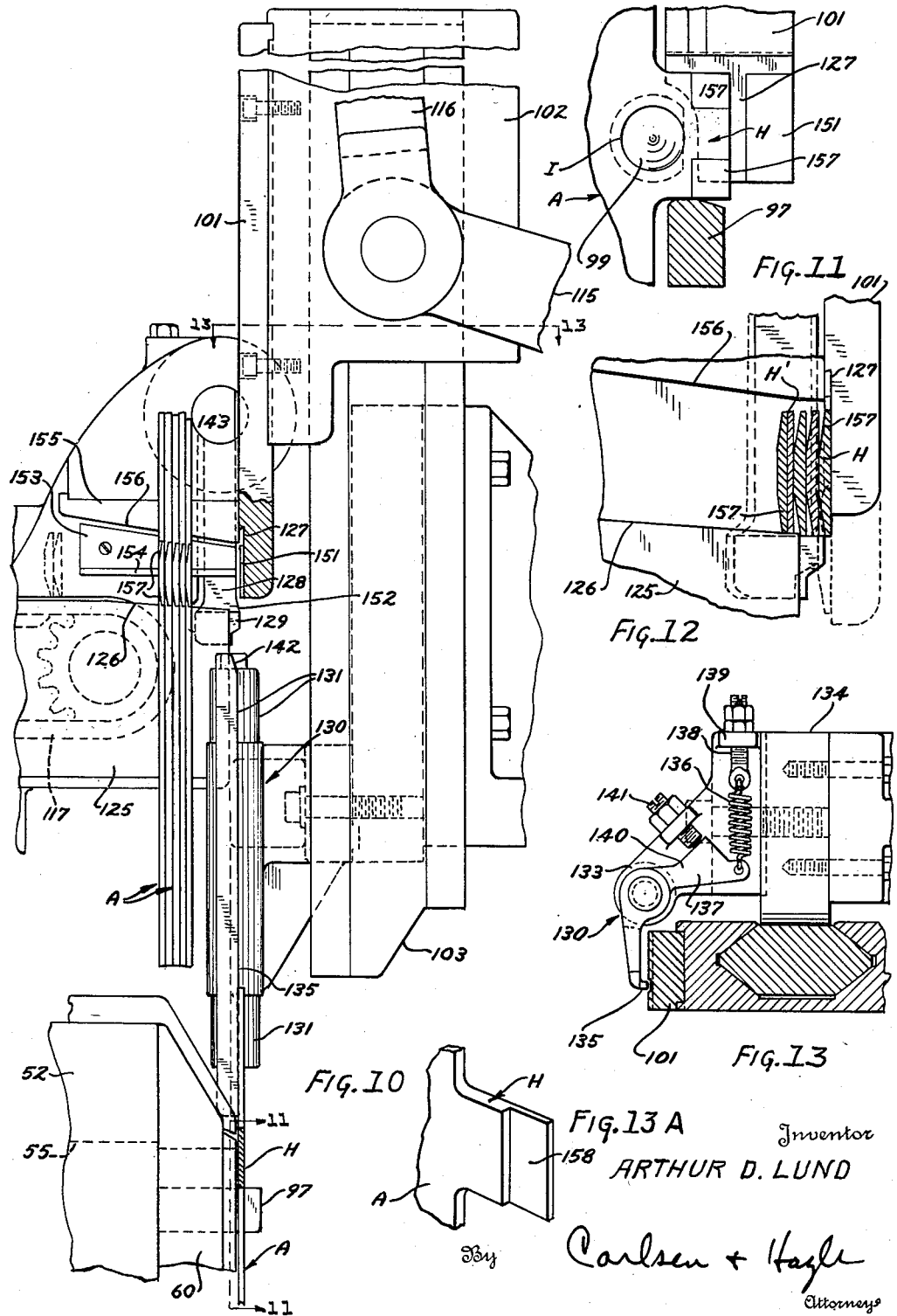

Jan. 13, 1953 — A. D. LUND — 2,625,223
AUTOMATIC PLATE TRIMMING MACHINE
Filed Oct. 17, 1946 — 8 Sheets-Sheet 8
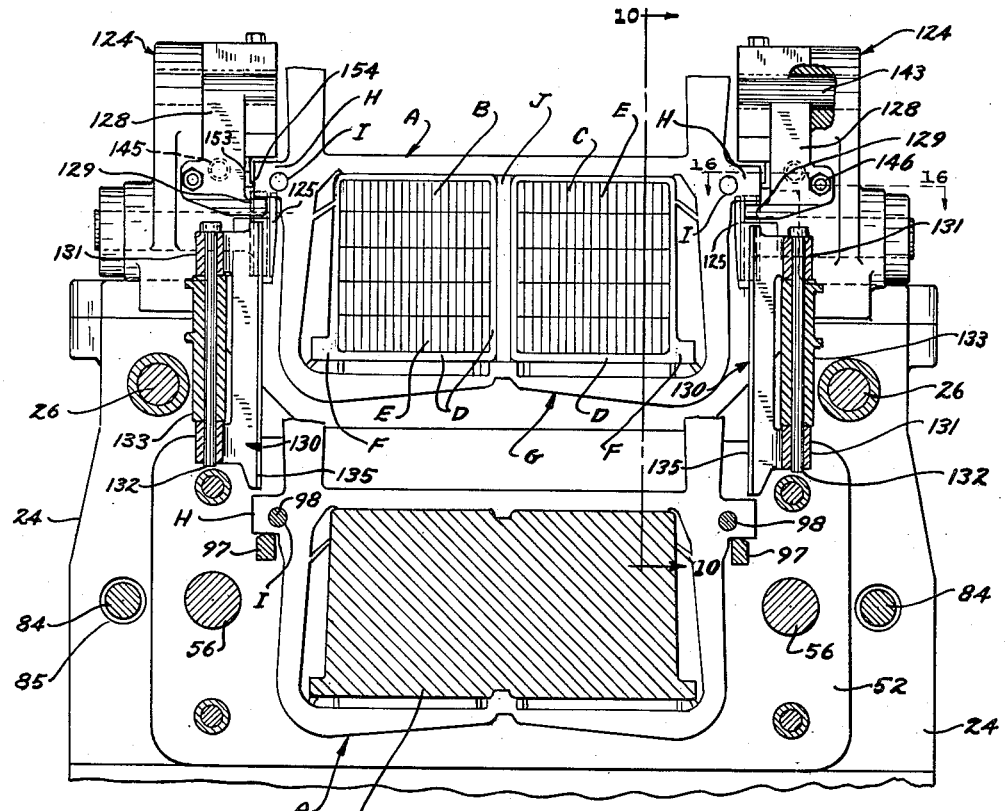
FIG. 14
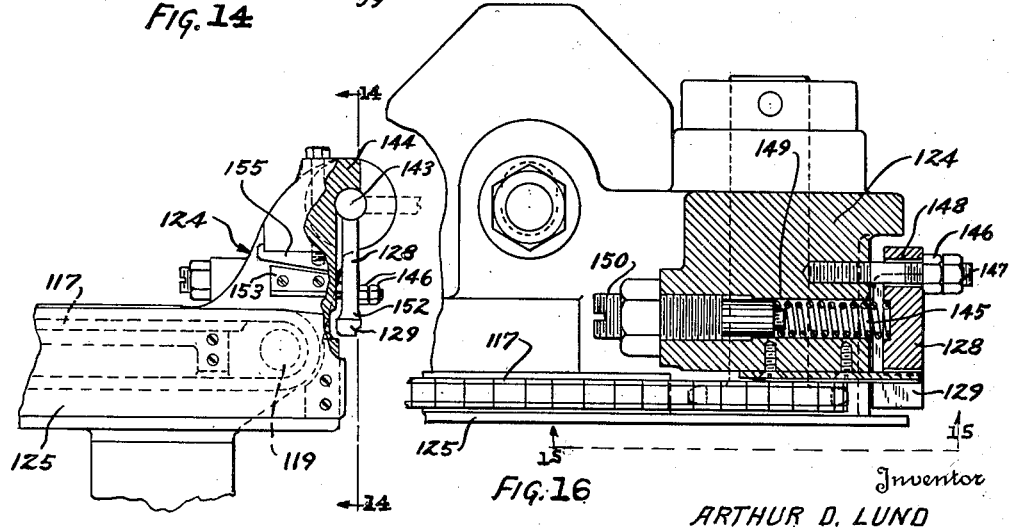
FIG. 15
FIG. 16
Inventor
ARTHUR D. LUND
By Carlsen & Hazle
Attorneys Patented Jan. 13, 1953

2,625,223

UNITED STATES PATENT OFFICE 2,625,223

AUTOMATIC PLATE TRIMMING MACHINE

Arthur D. Lund, Minneapolis, Minn., assignor to Solar Corporation, Milwaukee, Wis., a corporation of Delaware Application October 17, 1946, Serial No. 703,799

15 Claims. (Cl. 164—21)

This invention relates generally to improvements in machines for making storage battery grid plates and more particularly to a machine for trimming the plates to size.

The grids used in storage batteries, for carrying the electro-chemical material, are in accordance with present day production methods of manufacture cast in units of two in what are generally called grid plates or grid panels. These two grid plates remain connected together until the grids are cast, sized, and bonded and finally ready for installation in the battery, whereupon the plates are split to separate the grids, ready for assembly into cell units. The first operation is, of course, the casting of the grid plates and for reasons of properly molding, filling, and evenly distributing the molten material throughout the mold, the plates when completed necessarily have a marginal frame surrounding the grids which must be trimmed off accurately before further operations. It may here be noted that the casting operation may be carried out in any of the high speed machines well-known in the art and such as represented by United States Patents No. 1,747,552, issued February 18th, 1930; No. 1,811,143, issued June 23rd, 1931; Nos. 1,843,774, 1,843,775, 1,843,776 and 1,843,777, all issued February 2nd, 1932; No. 1,959,484, issued May 22nd, 1943; No. 2,028,790, issued January 28th, 1936, and No. 2,194,082, issued March 19th, 1940. The sizing, as to thickness, may be carried out by a machine such as shown in United States Patent No. 2,098,808, issued November 9th, 1937. The pasting of the plates with the active material may be carried out by machines such as shown in United States Patents Nos. 2,081,943 and 2,081,944, issued June 1st, 1937, and the bonding of the plates after pasting may be done in a machine such as shown in United States Patent No. 2,195,723, issued April 2nd, 1940.

My present invention has as its primary object the provision of a high speed automatic machine into which the rough cast plates may be fed from the casting machine and which will operate to accurately trim off the marginal material and deliver the plates ready for further operations, while separately disposing of the scrap material trimmed from the plate. The machine embodies as its primary operating elements a punch and die properly shaped to punch out the plates, and it is further an important object of my invention to provide means whereby the marginal scrap may be disposed of without requiring that it itself be cut into sections in order to free it from the punch.

Another object of my invention is to provide a machine in which the operations of feeding the plates in succession to the punch and die, and separate delivery of the trimmed plates and scrap, are all positively and mechanically timed to the end that the machine will operate rapidly and without danger of jamming or otherwise becoming inoperative. In connection with this object of my invention, I provide means whereby the plates may be fed one at a time to the punch and die regardless of the thickness of the plates, so that the machine will accommodate itself to operation upon plates of all conventional thicknesses without any resetting or attention upon the part of the operator.

Still another object of my invention is to provide a machine for this purpose which embodies a frictionally retarded ejector means in the die, against which the punch forces the plate in order to trim away the margin, and which ejector means due not only to the frictionally resisted displacement aforesaid, but to its inertia as well, will allow the plates to be pressed out flat by the punch so that any warping of the plates which may occur during the casting operation will be overcome and the plates will be delivered in perfectly flat condition.

These and other more detailed and specific objects will be disclosed in the course of the following specification, reference being had to the accompanying drawings, in which—

Fig. 3 is a longitudinal and vertical sectional view through the machine.

Fig. 4 is a horizontal and longitudinal and sectional view through the machine taken substantially along the line 4—4 in Fig. 3.

Fig. 4A is an end view of the means for frictionally retarding the movement of the plate ejecting means.

Fig. 5 is a top plan view of the machine and with certain parts thereof shown broken away and in section to disclose certain details of construction.

Fig. 10 is an enlarged fragmentary side elevation of the upper portion of the die and the delivery point for the plates and the stripper element by which the plates are fed one at a time to the die, this view being taken substantially along the line 10—10 in Fig. 14.

Fig. 11 is a fragmentary detail and sectional view along the line 11—11 in Fig. 10 showing the manner in which one plate is supported over the die ready for trimming.

Fig. 12 is an enlarged detail view showing the support lugs upon the plates in section and illustrating the operation of the stripper element by which the plates are taken one at a time from the delivery point and fed to the die.

Fig. 13 is a horizontal sectional view along the line 13—13 in Fig. 10.

Fig. 13A is a fragmentary perspective view of a modification of one of the grid plate lugs.

Fig. 14 is an enlarged vertical and cross sectional view through a central part of the machine viewing the die from its face and taken substantially along the line 14—14 in Fig. 5 and along the line 14—14 in Fig. 15.

Fig. 15 is a fragmentary detail side elevation along the line 15—15 in Fig. 16.

Fig. 16 is an enlarged fragmentary horizontal sectional view along the line 16—16 in Fig. 14.

Figure 1:
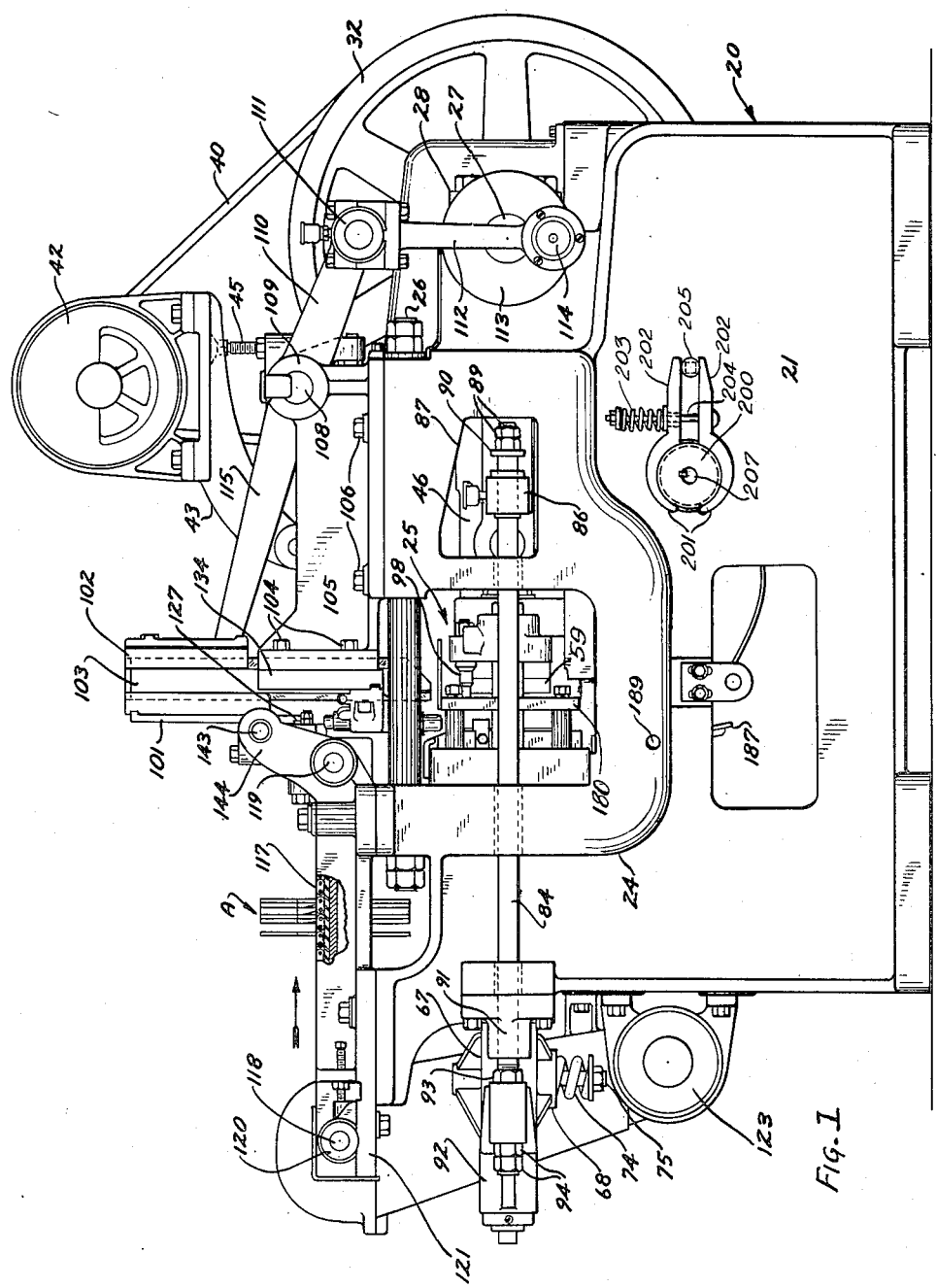
Fig. 1 is a side elevation of a machine embodying my invention and viewing the same from what will be hereinafter for convenience sake referred to as its front or forward side.

Referring now more particularly and by reference characters to the drawing, my improved machine comprises a main or base frame unit designated generally at 20 which is of heavy cast construction and has upright spaced side portions 21—22 rigidly joined by cross members, designated throughout at 23. The upper center portions of the frame side portions 21 and 22 have heavy, laterally enlarged U-shaped portions 24 forming a transverse opening wherein is located the punch and die mechanism, designated generally at 25. The upper portions of the U-shaped enlargements 24 are held rigidly together by tie bolts indicated at 26 in order to counteract the spreading pressure between these portions occasioned by operation of the punch. Adjacent one end of the frame I provide a main drive shaft 27 journaled in bearings 28 and provided at its center with a crank 29 for operation of the punch. A sleeve 30 (Fig. 4) is keyed, as indicated at 31, to the rear end of the shaft 27 and journaled upon the sleeve is a fly wheel 32 held in place by a flat circular cap 33 secured by a cap screw to the shaft. The sleeve 30 has a radial extension 35 in which is a bushing 36 adapted to register with a similar bushing 37 in one spoke of the fly wheel 32 to receive a shear pin indicated at 38. The fly wheel 32 has circumferential grooves 39 adapted to receive a plurality of V-belts 40 which operate over a similarly grooved pulley 41 driven by an electric motor 42 or other suitable prime mover. As herewith shown the motor 42 is supported upon a swinging base 43 pivoted at 44 to an upper portion of the frame assembly of the machine and one or more screws 45 are arranged to raise and lower the motor with respect to the frame in order to tighten the belts 40. The foregoing arrangement is such that operation of the motor 42 will rotate the fly wheel 32 and operate the drive shaft 27 but it will be understood that should a jam occur any place in the machine parts driven by the drive shaft the shear pin 38 will be sheared off the bushings 36 and 37 allowing the fly wheel to turn freely, and the machine to stop.

The punch and die mechanism 25 comprises a cross head indicated at 46 having at its sides flat gibs or keys 47 which are slidably mounted in guides or ways 48 provided for their accommodation in the rigid top portion 49 of the frame assembly. The cross head 46 is thus supported for reciprocation lengthwise in the frame or parallel with the sides 21 and 22 and to so operate the cross head I provide a connecting rod 50 which is pivoted at one end on a cross pin 51 in the cross head and its other end is mounted upon the crank 29 which translates the rotary motion of the drive shaft 27 in the usual manner. It will be apparent then that the operation of the drive shaft 27 will result in a back and forth movement of the cross head 46 at a frequency dependent upon the rate of rotation of the drive shaft and through a range or amplitude which is determined by the throw of the crank 29.

The punch and die mechanism 25 further includes a die bed or face plate 52 (Fig. 3) which is rigidly secured crosswise between the frame sides 21—22 in facing and spaced relation to the cross head 46. The frame has a massive cross portion 53 in which the bed plate 52 is fastened and which has an opening 54 registering with a large clearance opening 55 provided in the bed plate. The bed plate 52 is provided at its opposite ends with the usual posts 56 on which a punch plate 57 is slidably mounted by suitably bored and bushed bosses 57ª formed at its ends for this purpose. The punch plate 57 is thus supported for movement toward and away from the die bed plate 52 and to so operate the punch plate it is secured, as designated at 58, to the adjacent end face of the cross head 46.

Referring now for the moment to Fig. 14 particularly, I show therein at A the usual grid panel or plate in the shape and in the condition in which it comes from the casting machine. As will be noted this grid plate includes two grids B and C having the usual marginal frames D within which are formed the reticulated centers or wires E for receiving and holding the pasty electro-chemical material. The lugs F by which the grids are finally connected and supported in the battery project in opposite directions and serve during the manufacturing processes as a means by which the trimmed plates may be carried and conveyed during various operations as pointed out in detail in the earlier patents hereinbefore identified. During the casting operation, as has also been previously referred to, there is formed about the two grids a completely enclosing, marginal frame designated generally at G, which must be trimmed off in order to render the grid plates ready for further operations and it is of course for the purpose of cutting off this marginal material G evenly and accurately around the margins and lugs of the grids D and C that I provide the present machine. It will be noted that the marginal material G which encloses the grid plates as they come from the casting machine has laterally projecting lugs H near its upper corner portions and inwardly of which lugs there are formed openings I through the plates. It will, of course, be understood that the grids B and C are joined by an intermediate ribbed portion J and that this rib is not removed by the present trimming operation but is retained to hold the grids in connected relation during all operations up to the point where the grids are split and finally assembled for insertion into the batteries.

In order to perform the necessary trimming operation the punch plate 57 will obviously be required to carry a punch 59, the exterior shape of which is identical to the shape of the grids B and C when they are removed from the waste marginal material G while the die bed plate 52 will carry a die 60 having an opening 61 shaped and sized to nicely receive the punch 59 with a shearing action all around its edges. The exact details of the punch and the die and their mounting and arrangement upon the punch plate 57 and bed plate 52 are largely conventional and will not be described in detail herein. It will be obvious, however, that when one of the rough cast plates A is supported over the face of the die and properly centered with respect thereto that the forward or working stroke of the cross head 46 will carry the punch 59 up against the plate and will shear out the center thereof to the desired outline, pushing the finished plate slightly into the die opening 61 in order to shear the marginal material G off cleanly and evenly all around the plate.

As a support against which the grid plate may bear as it is forced into the die, and also as a means for ejecting the trimmed grid plate therefrom, I provide a heavy ejector member or plate designated at 62 which is, of course, shaped to nicely fit the opening 61 in the die. This ejector plate 62 is secured, as designated at 63, to the end of a massive ejector slide member 64 which, like the aforesaid cross head 46 is provided with gibs or keys 65 along its sides slidably supported in ways 66 secured in the upper portion of the frame. The arrangement is thus such that the slide member 64 and attached ejector plate may move back and forth in the same direction and plane as the cross head 46, as will presently appear. Such movement of the slide member 64 and ejector plate 62 is permitted but frictionally retarded by means of a pair of pressure plates 67 and 68 extending transversely outwardly of the adjacent end of the machine frame and bearing respectively downwardly and upwardly upon friction shoes 69 and 70 which engage the flattened upper and lower faces of an extension 71 which is bolted at 72 to the end of the slide member 64 and abutted against a shoulder 73 formed thereon. The plates 67 and 68 are yieldably drawn together by heavy expansion coil spring 74 braced upwardly against the lower plate 68 and coiled about a stud 75 threaded at 76 into the upper plate. The lower end of the stud 75 has a nut and washer 77 by which the spring 74 is supported and adjusted in order to bring the tension of the spring into play to draw the plates together. The extremities of the plates 67 and 68 loosely straddle studs 78 which are threaded into the adjacent ends of the frame as designated at 79 in Fig. 4. Clamp plates 80 are placed on the studs 78 to engage opposite edge portions of the plates 67—68 and so hold the plates against movement with the slide extension 70. Limited movement of the plates 67—68 is provided however both upwardly and transversely by the provision of spacing sleeves 81 upon the studs between the aforesaid clamp plates 80. The length of these spacing sleeves 81 is such that when nuts 82 on the ends of the studs 78 are pulled up tight the clamp plates 80 will be held tightly on the sleeves without clamping engagement with the ends of the plates 67—68, which are thereby left free to move slightly and in different directions in order to accommodate this friction mechanism to any minor irregularities in the movements of the ejector slide. The clamp plates 80 will, however, so closely fit the extremities of the plates 67—68 that they will be locked against all but extremely minute movements with the slide. The aforesaid stud 75 penetrates the slide extension 71 and an elongated slot 83 is provided in this extension to enable the slide to move with respect to the friction mechanism to the desired range.

In its normal or inoperative position the ejector plate 62 projects slightly from the face of the die 60 toward the punch as shown in Figs. 3 and 4. From this position the ejector plate is moved into the opening in the die by the pressure of the grid plate as it is being trimmed and forced into the die by operation of the punch and it will, of course, be understood that this movement of the ejector plate is very slight due to the fact that it projects but little beyond the face of the die and will enter the die on its opposite movement only a distance equal to the thickness of the grid plate. To return the ejector plate from its position inside the die back to its normal position, I provide slide rods 84 which extend alongside the punch parallel thereto and through openings 85 provided in the machine frame for the reception of these rods. This arrangement is best shown in Fig. 4 and it will be evident that the openings 85 are substantially larger than the slide rods so that no binding can occur. The slide rods 84 are operated in synchronism with the punch and for thus operating the rods I provide laterally extending brackets 86 which are secured to opposite sides of the cross head 46 and extend out loosely into openings 87 in the lateral enlargements 24 of the frame. The extremities of the brackets 86 carry bushings 88 which slidably receive the adjacent ends of the slide rods 84 and at these ends the slide rods are provided with nuts 89 which hold collars 90 tightly against shoulders upon the rods. This construction is such that upon the forward or working movement of the punch the bushings 88 will slide freely upon the rods 84 without moving the rods as will be understood. The opposite ends of the slide rods 84 extend through bearings 91 secured upon the end of the frame and pass through the apertured ends of a transverse yoke 92 which crosses the outer end of the slide extension 71. Nuts 93—94 upon the ends of the slide rods anchor the same to the yoke 92 permitting adjustment of the yoke with respect to the rods in a manner which will be clearly apparent. At its center the yoke 92 has a stop screw 95 which is adapted to engage a boss 96 upon the adjacent end of the slide extension 71 in such manner that a movement of the slide rods 84 and of the yoke to the right as viewed in Fig. 4 will cause the screw to engage and correspondingly move the slide extension and the slide 64. It will thus be understood that upon the forward or working stroke of the punch the lost motion connections provided between the cross heads 86 and the slide rods 84 will permit the punch to travel without the movement of the yoke 92 or of the slide 64. As the punch then completes the working stroke and forces the grid plate into the die in order to trim off the margin G of the plate the ejector plate 62 will be pushed into the die in the manner previously set forth.

The lengths of the rods 84 and the position of the yoke 92 thereon as well as the adjustment of the stop screw 95 are all then such that as the punch approaches the end of its return stroke away from the die, the bushings 88 in the ends of the brackets 86 will engage the collars 90 and pull the slide rods 84 in the same direction. The adjustment is further such that the amount of this movement of the slide rods 84 will be sufficient to exactly return the slide 64 and ejector plate 62 to their normal positions as the punch reaches the end of its return stroke.

It will be observed that the frictional engagement between the shoes 69—70 and the slide extension 71 will be such as to hold the slide and ejector plate in either of its two said positions without requiring the use of any spring such as have been previously used for similar purposes. It will further be noted that the massive construction of the slide and ejector plate and its frictional retarded movement is such as to provide an inertia sufficient to enable the punch to flatten out a grid plate against the ejector plate. As the grid plates come from the casting machine they are frequently warped and it is very desirable that the punch strike the plates with sufficient force to flatten them out and leave them perfectly straight for succeeding operations as aforesaid. The inertia provided by my ejector mechanism provides a foundation by which the punch may strike the plates and bring them out flat before and as the margins are sheared away.

Figure 6:
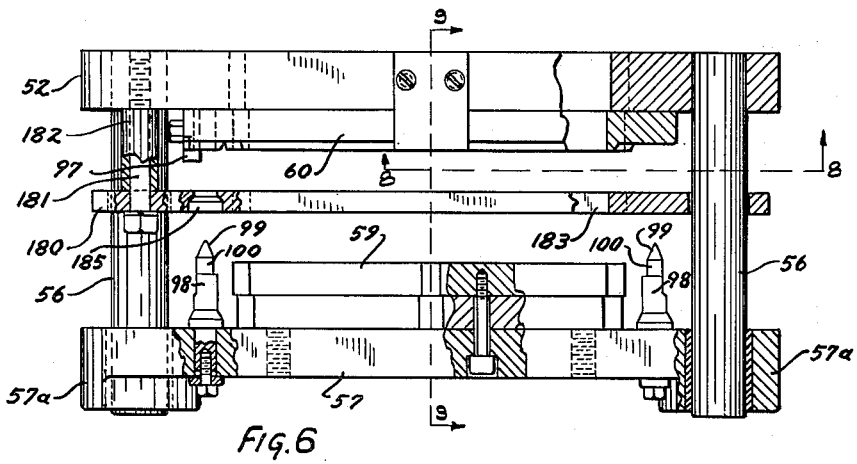
Fig. 6 is an enlarged plan view of the punch and die and associated elements of the machine as distinct from other parts thereof and with portions broken away and in section to disclose the mounting and formation of certain parts.
Figure 7:
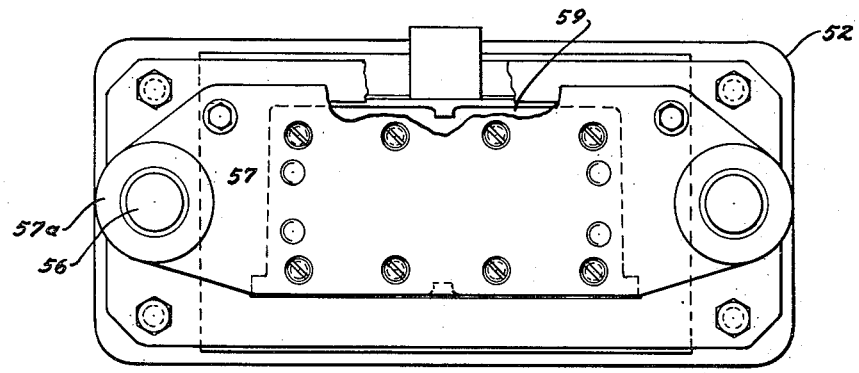
Fig. 7 is an elevational view of the punch and die viewing the same from the end thereof located at the bottom in Fig. 6.
Figure 8:
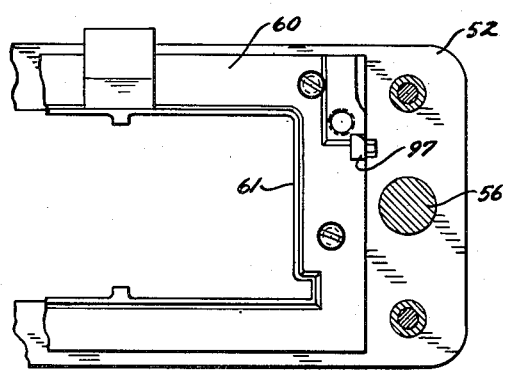
Fig. 8 is a fragmentary sectional and elevational view along the line 8—8 in Fig. 6.
Figure 9:
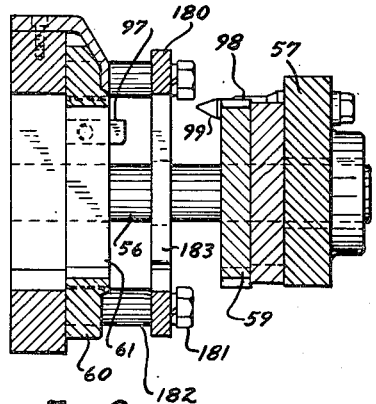
Fig. 9 is a longitudinal and vertical sectional view along the line 9—9 in Fig. 6.

The grid plates are arranged to be fed one at a time to the die by a mechanism later to be described and the operation of which is such as to drop the plates one at a time to a vertical position immediately over the face of the die 60. In this position the plates come to rest with their lugs H in supported relation upon hanger fingers 97 as best shown in Fig. 14, which fingers are mounted on and project from the face of the die in position to upwardly engage lower edges of the said lugs. When thus supported in front of the die upon their lugs H, the grid plates A are roughly registered with the die but due to the fact that clearance must be provided between the fingers 97 so that the plates may drop easily down therebetween and due, too, to the fact that the lugs H may sometimes be slightly irregular in shape I provide added means for accurately centering the grid plates with respect to the die opening to insure accurate trimming of the plates. Such centering means comprises registering pins 98 which are best shown in Fig. 6 and which are secured to the punch plate 57 so that they project forwardly toward the die. The forward or free end of the pins 98 are tapered as indicated at 99 and are therefore adapted to enter the aforesaid openings I provided in the rough cast plates A adjacent the lugs H. The pins 98 further have straight portions 100 which terminate in the aforesaid tapered ends 99 and the diameter of these straight portions is such as to quite tightly fit the aforesaid openings I. As will now be clearly evident the forward movement of the punch will cause the pointed ends of the pins 98 to enter the openings I and the straight portions 100 to force themselves tightly thereinto and it will be apparent that the pointed ends of the pins will have a centering effect such as to very accurately locate the grid plates with respect to the punch and die. I am thus able to so accurately trim the plates that the individual grids B—C thereof will have margins of the desired even widths at all sides, and this very materially facilitates the pasting operation which occurs later in the manufacturing process.

The feed mechanism for feeding the grid plates to the punch and die comprises as its primary elements a pair of strippers or stripper bars 101 which are secured in transversely spaced and vertically depending positions to stripper slides 102 which are vertically slidably mounted upon guide bars 103. The guide bars 103 are secured in upstanding positions by means of bolts 104 to side brackets 105 secured in turn by bolts 106 upon the sides of the frame over the cross head 46. In such position the strippers 101 are arranged directly over the die 60 and they are so supported that they may move upwardly and downwardly in vertical planes located immediately forward of the die face. To thus operate the strippers, I provide a tubular rock shaft 107 which is journaled upon a fixed shaft 108 secured in apertured bosses 109 at the ends of the side plates 105 and from this rock shaft there is extended an arm 110 pivotally connected at 111 to a crank 112. The crank 112 hangs down along the adjacent end of the drive shaft 27 upon which is secured an eccentric disk having a pin 114 connected to the lower end of the crank. Arms 115 are then extended from the rock shaft 107 toward the stripper slides 102 to which the extremities of the arms are connected by links 116. The arrangement is thus obviously such that the rotation of the drive shaft will oscillate the rock shaft 107 moving the arms 115 upwardly and downwardly at the ends connected to the links 116, and moving the slides 102 and attached strippers 101 upwardly and downwardly upon the guide bars. In their normal positions the strippers 101 stand in vertically spaced relation well above the die 60 as shown in Figs. 3–10.

The rough cast grid plates A are fed to the machine by a chain conveyor system which is quite similar to conveyors used in prior patents heretofore referred to and as here shown the conveyor comprises spaced sprocket chains 117 which run over sprockets secured upon inner and outer sprocket shafts 118—119. The outer shaft 118 is mounted in bearings 120 adjustably secured to frame members 121 extending from the frame out above the friction device for the stripper slide, and this shaft is driven by a sprocket chain 122 from a motor 123 mounted upon the end of the frame below said friction device. The inner shaft 119 is journaled in bearing members 124 secured upon the frame above the die bed 52 and the sprocket chains 117 are thus positioned above the ejector slide mechanism and run parallel with each other, longitudinally of the frame. The shaft 119 does not connect the sprockets at this end of the chain and the shaft is in reality only short steel shafts journaled in the bearings 124. The chains are so driven by the motor 123 that their upper spans or flights run in the direction of the arrow in Fig. 1 toward the strippers 101 and the spacing of the chains is such that the plates A may be supported by their lugs H upon the chains to be carried thereby toward the strippers. This is, as stated, a well-known means for transporting or conveying the plates and no further description should be necessary herein. Secured to the frame and extending along the inside of the chains 117 are guide strips 125 which terminate at their ends a short distance from the path of the strippers 101 and the upper edges of these guide strips angle downwardly toward their extremities as designated at 126 so that as the grid plates are carried toward the strippers the lugs H will drop off the chains onto these angular portions or edges of the plates. This construction is best seen in Fig. 10 and it will be apparent that, as the sprocket chains 117 run downwardly over the sprockets at this end of the conveyor, the lugs H will be dropped down upon the guide strips 125 and that the inclined edges 126 thereof will allow the grid plates to slide downwardly toward the strippers 101. In their normal positions the strippers 101 will stop this movement of the grid plates, or in other words, the plates will pile up against the strippers and the lower ends of the strippers will contact the lugs H. Said lower ends of the strippers 101 have notches 127 open toward the plates and into which notches the lugs H of the plate nearest the strippers will come to rest as seen in Fig. 12. Actually the grid plates nearest the strippers 101 move off the edges 126 of the guide strips 125 and they are temporarily supported by fingers 128 having hooks 129 which project inwardly toward the outer surfaces of the grid plates 125 in such positions that the plate lugs may drop upon the hooks 129 and be supported thereby. The fingers 128 are supported by means later to be described in such position that the hooks 129 will supportably engage the lugs H of the grid plate resting in notches 127 in the strippers 101, so that this plate will not drop clear but will be positively fed to the die by action of the strippers.

Positioned below the transfer point between the conveyor mechanism and the strippers are guide members designated generally at 130 having upper and lower vertically spaced hinge eyes 131 by which they are pivotally mounted upon pins 132 carried in brackets 133 secured to support bars 134 forming part of the support for the stripper guide bars 103 and attached to the side brackets 105. The guide members 130 have vertically elongated narrow guide ribs 135 which extend from a point immediately above the die 60 to positions immediately below the hooks 129 on the fingers 128. In their normal positions the guide ribs 135 further stand in substantially the same vertical plane as the edges of the strippers 101 as seen in Fig. 10 and to thus hold the ribs 135 in their normal positions I provide springs 136 (Fig. 13) which are stretched between arms 137 extending from the upper hinge eyes 131, and which are connected to eye screws 138 secured in ears 139 formed on the brackets 133 which carry the hinge pins. The operation of the springs 136 as such as to tend to oscillate the guide members 130 in a direction such as to project the ribs 135 into the path of the strippers 101 but such movement of the guide members are limited by stops 140 formed on the arms 137 and engaging adjustable stop screws 141 upon the brackets 133 so that in their normal positions as aforesaid the ribs 135 will stand just clear of the downward path of the strippers. The upper extremities of the guide ribs 135 are beveled off as indicated at 142 as seen in Fig. 10.

The aforesaid fingers 128 are secured to and depend downwardly from short shafts 143 which are journaled in upward extensions 144 of the bearing members 124 and the fingers are so supported that they extend downwardly clear of the ends of the plate lugs H with the aforesaid hooks 129 turned inwardly therebeneath and terminating just short of the adjacent corners of the plates 125. Expansion coil springs, one of which is shown at 145 in Fig. 16, are braced against the fingers 128 in such position as to normally tend to swing the fingers toward the strippers 101 and such movement is limited by stop nuts 146 upon studs 147 screwed in the bearings 124 and extending loosely through openings 148 in the fingers. The nuts 146 are so adjusted that the fingers 128 will stand with their hooks 129 in position to support the lugs H of the grid plate engaged by the strippers 101. But the pivotal support of the fingers is such that they may move clear of the path of this grid plate in order to allow the strippers to feed the plate downwardly, as will be clearly evident. Such clearing movement of the fingers 128 is yieldably permitted by the springs 145 and as shown in Fig. 16 these springs are positioned in sockets 149 formed for their accommodation in the bar members 124 and screws 150 plug these sockets to act as supports for the springs. The notches 127 in the strippers 101 do not extend entirely across the strippers but terminate short of the outer edges thereof leaving cam ribs 151 shown in Figs. 10–11 adapted, upon the downward travel of the strippers, to engage cam surfaces 152 upon the fingers 128 and thereby to urge the fingers out of the way of the plate being fed by the strippers.

As the grid plates approach the strippers the ends of their lugs H move between end guides 153 which are secured to inner faces of the bearing members 124 and have ribs 154 so spaced as to just provide clearance therebetween for the plate lugs. This insures that the plates will be registered transversely and prevents any end-wise displacement of the plates such as might interfere with the proper registry of their lugs H with the stripper notches 127. I also provide on the bearing members 124 hold-down bars 155 having lower edges 156 which slope downwardly toward the strippers. The lower edges 156 overhang the lugs H of the grid plates and, adjacent the point to which the plates are engaged by the strippers, these edges stand in closely spaced relation to the upper edges of the lugs. The purpose here is to prevent the grid plates from moving upwardly for any reason to a point such that the notches 127 could not engage the lugs H and it will be evident in Fig. 10 that the upper ends of the notches 127 stand well above the lowermost ends of the hold-down member edges 156 when the strippers are in normal positions, for this purpose.

In the operation of this conveyor and feed mechanism the grid plates supported by their lugs H upon the chains 117 will be moved toward the strippers and will accumulate upon the upper edges of the guide strips 125 in position to be stripped one at a time from this accumulated "stack" and fed downwardly to the die. It will, of course, be understood that the pressure of the grid plates approaching the transfer point will bring the endmost plates thereof tightly together exerting some pressure on the plate nearest the strippers and forcing its lugs H into the notches 127. Thus upon rotation of the drive-shaft 27 to start the punch toward the die the rock shaft 107 will be operated to move the arms 115 downwardly and the resulting downward movement of the strippers 101 will cause their notches 127 to start the endmost grid plate downward toward the die. Very slightly before the upper ends of the notches 127 engage the upper edges of the lugs H the cam ribs 151 will engage the fingers 128 swinging them just far enough away to permit these lugs to clear the hooks 129, permitting the plate to be moved downwardly by the strippers. The lugs H of this plate will then engage the cam ends 142 of the guide ribs 135 swinging the guide members slightly away from the path of the strippers but the spring bias upon these guide members is such that the plate lugs will be gripped between the strippers and the guide ribs 135 in such manner as to hold the lugs tightly in the notches 127 for the full length of the ribs. The downward movement of the strippers 101 continues until the plate lugs H move off the guide ribs 135 at which point the plate is released immediately over the hanger fingers 97 upon which the lugs H then drop, positioning the plate over the die. This feed action, of course, occurs before the punch reaches the die and the strippers 101 move upwardly again as the punch starts its return stroke so that as the punch reaches its normal inoperative position the strippers are again in position to receive the lugs of the next plate. It will be understood, of course, that the length of the strippers 101 is such that they will maintain engagement with the accumulation of grid plates while one plate is being fed to the die to prevent any disarrangement of the plates during this operation. As the strippers rise there is, of course, some friction upon the plate nearest the strippers but it is prevented from being elevated by the hold-down members 155 previously described.

Battery grid plates are made in various thicknesses and in order that my machine may feed one plate at a time accurately and positively regardless of the thickness of the plates. I contemplate beveling the lugs H at upper and lower portions as indicated at 157 in Figs. 10–12. Since it is the thickness of the upper edges particularly of the lugs H which controls their proper engagement in the notches 127 and in the strippers 101, it will be apparent that by thus beveling the lugs they may be caused to have edge thicknesses which are the same regardless of the thickness of the remainder of the lugs and of the plates themselves. In Fig. 12, I show several lugs of different thicknesses thus properly beveled while I show one lug, designated at H', which is of the same thickness from top to bottom, as it would be for the thinnest plate usually made. Obviously instead of beveling the lugs H they may be merely cut away to constant thickness at their outer ends from top to bottom as indicated at 158 in Fig. 13A. It will, of course, be understood that the fingers 128 and guide members 130 will accommodate themselves to plates of all thicknesses and that by thus beveling or thinning the lugs H, the machine will feed the plates properly one at a time even if a number of different sizes of plates occur in the same batch.

As has been previously mentioned, the rough plates as they are received from the casting machine are frequently warped and it therefore may occur that the end plates next to the strippers may have a tendency to buckle outward away from the accumulated rank of plates. In order to overcome this and to hold the plate straight as it is fed downwardly to the die, as well as to support the center of the accumulated "stack" of plates I provide a pressure roller indicated at 159 (Fig. 3) which is positioned midway of and below the strippers 101 (when they are raised) and is journaled at the lower end of an arm 160 pivoted upon a transverse pin 161 carried in a bracket extension 162 of a bracket plate 163. Said bracket plate 163 is secured at 164 to the base 165 which joins the aforesaid side brackets 105 and which is, of course, a rigid part of the frame. The roller 159 is thus so positioned that it will engage the center of the plate nearest to the strippers 101 and the roller is held at such engagement, while the strippers are elevated and while they are in processes of engaging and starting this plate downwardly, by a plunger 166 arranged to slide toward and away from the arm 160 below the pin 161. The said plunger 166 is actuated by an arm 167 extending radially and downwardly from the tubular rock shaft 107 and provided with a contact screw 168 adapted to engage a sleeve 169 slidably mounted upon the plunger. A bearing 170 slidably supports the sleeve 169 while apertured ears 171 loosely pass the plunger and support it for axial movements. An expansion coil spring 172 is placed on the plunger between the sleeve 169 and a collar 173 conventionally adjustably supported upon the plunger and this spring is thus so positioned as to normally urge the plunger 166 toward and into contact with the arm 160 to bring the roller 159 to bear against the grid plate. The arrangement, however, is such that when the strippers 101 move downwardly the resulting upward movement of the arm 167 caused by rotation of the rock shaft 107 will cause the stop screw 168 to clear the end of the sleeve 169 which may then move axially with respect to the plunger 166 under pressure of the spring 172 to relieve the force with which the roller 159 is urged against the grid plate. Thus it will be seen that as the strippers obtain a firm grip upon the lugs H of the grid plate and carry these lugs down against the guide members 130, the pressure of the roller 159 will be relieved allowing the plate then to pass on down to the die without interference. A retractile coil spring 174 is provided and is so arranged as to pull the roller 159 away from the grid plate when the plunger 166 is allowed to move axially by the aforesaid operation of the arm 167 during the downward travel of the strippers 101. Adjustable stop nuts 175 are threaded upon the plunger 166 and are arranged to engage one of the apertured ears so that the positions of the roller 159 may be adjusted as will be understood.

In the trimming operation the punch 59 will shear out the grid plate to proper shape and will, as previously set out, force this part of the plate into the die opening and against the ejector plate 62. The scrap material formed by the marginal frame G which is trimmed off will then be positioned around the punch 59 and it must, of course, be removed and disposed of before the next operation. For this purpose I provide a stripper plate or frame 180 which is supported over the face of the die in spaced parallel relation thereto by means of studs 181 and interposed spacers 182. This stripper plate 180 has an opening 183 adapted to nicely clear the punch 59 and it will further be understood that the stripper plate is so positioned that the punch must pass through it before reaching the grid plate which is supported over the face of the die. Thus it will be evident that when the punch completes its working stroke and travels back on its return stroke it will carry along the trimmed off frame G of the rough cast plate and as the punch travels back through the opening in the stripper plate this waste frame will be engaged by the plate and pulled or stripped off the punch. The frictional grip of the scrap frame around the shearing edges of the punch is sufficient to carry the scrap back against the stripper plate 180 but this grip upon the scrap by the punch is augmented by the hereinbefore described locating pins 98 which force themselves into the openings I in the grid plates during the punching operation. Thus the scrap frame of material will in all cases be pulled away from the die so that the lugs H may clear the locating fingers 97 and allow the scrap to drop away from the space between the punch and die and it will further be noted that this stripping mechanism permits the scrap to drop into the clear without requiring that the scrap be cut into sections as has all previous trimming machines of my knowledge. As shown in Fig. 6 the stripper plate 180 is provided with the necessary openings 185 to pass the pins 98 as the punch moves toward the die.

To separately dispose of the trimmed grid plates and the scrap I provide first of all a chute 186 which extends transversely between the frame sides 21—22 and opens up beneath the die and the stripper plate 180 for the full width thereof. Thus both the trimmed plate as it is ejected from the die by the ejector plate 62 and the frame of scrap material as it is stripped from the punch by the stripper plate may drop edgewise through the chute 186 of their own weight. To then separate the trimmed plates from the scrap, I provide a gate 187 extending transversely beneath the open lower end of the chute 186 and swingably supported at its ends by brackets 188 fastened to an actuating shaft 189 journaled transversely through the frame side members 21—22. In its normal position the gate 187 extends angularly beneath the bottom opening of the chute 186 downwardly toward a curved guide plate 190 which extends toward and terminates over the receiving end of a delivery conveyor designated generally at 191. The plate 190 is adjustably supported by a rod 192 in the base frame of the machine and the conveyor 191 may be a belt or any other suitable type of conveyor either built as a part of the machine or as an auxiliary part and merely slipped into the open end of the frame beneath the end of the plate 190.

Figure 2:
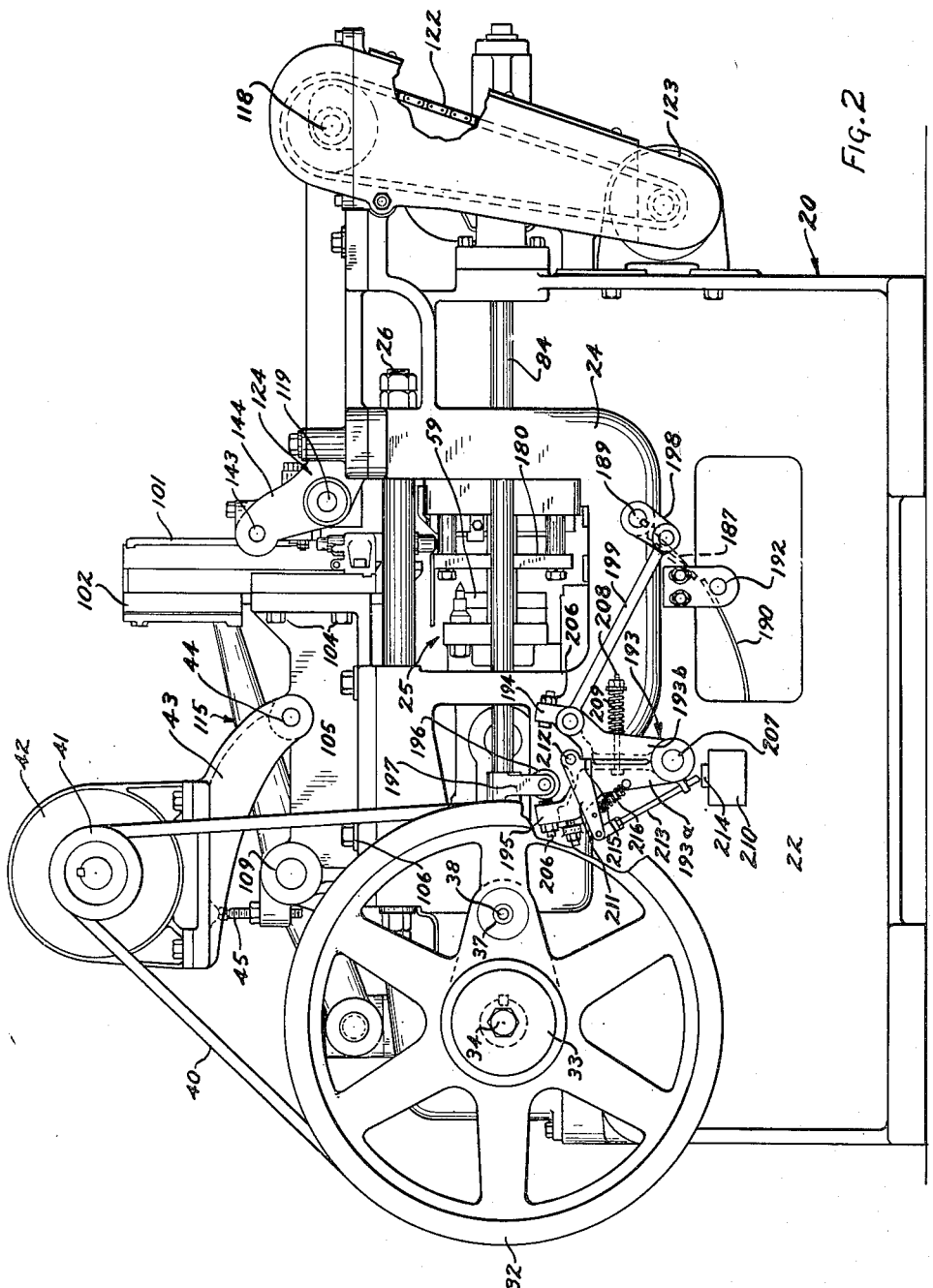
Fig. 2 is a similar elevational view but looking at the machine from the rear.

The aforesaid normal position of the gate 187 is the position it assumes as the punch completes its working stroke but the gate is also movable to a depending position as shown in dotted lines in Fig. 3 where it substantially clears the plate 190 and hangs almost straight down from the chute 186. For thus positioning the gate 187 I provide at the rear end of the frame a rocker member designated generally at 193 in Fig. 2 pivoted on a cross shaft 207. This rocker member has upwardly forked ends 194 and 195 between which plays a roller 196 carried by a bracket 197 secured to one of the cross head brackets 86 above the said rocker. A short crank 198 is secured upon the rear end of the actuating rod 189 and pivotally connected between this crank 198 and the rocker 193 is a link 199. The cross shaft 207 is further provided upon one end with a peripherally grooved brake pulley 200 (Fig. 1) and the curved ends 201 of a pair of brake arms 202 engage this wheel under influence of a spring 203 upon a stud 204 which joins the arms. The arms 202 are held against rotation with the pulley by engagement at their ends upon a stud 205 secured to the adjacent side 21 of the frame and this brake mechanism has the purpose of frictionally holding the associated actuating rod 189 and the gate 187 in any adjusted position. It will now be understood that as the punch approaches the end of its return stroke the roller 196 carried by the bracket 86 will engage the end 195 of the rocker 193 and oscillate it to the left as viewed in Fig. 2. As this movement occurs the gate 187 will be moved to its aforesaid normal position by the pull exerted through the link 199 upon the crank 198. On the other hand, as the punch approaches the limit of its forward, or working, travel toward the die, the roller 196 will engage the other end 194 of the rocker member and move the gate 187 in the opposite direction and toward its dotted line position in Fig. 3 as will be understood. Actually as seen in Fig. 2 the roller 196 does not engage the ends 194 and 195 of the rocker member but rather engages adjustable stop screws 206 in these ends and these stop screws may be adjusted to vary the angle through which the gate is swung by the travel movement of the punch.

The rocker member 193 is made in two similar sections 193a and 193b which are independently journaled upon the shaft 207. Normally, however, the two sections of the rocker are held together and caused to operate as a unit by a stud 208 which is secured to the section 193a and carries a spring 209 which bears between a nut at the end of the stud and the adjacent section 193b. The arrangement is thus such that should scrap material or a grid plate become jammed in the gate 187 no damage would occur due to the fact that the gate could not then be moved by the rocker. Such jamming would of course occur only when the gate is being moved from its dotted line to its full line position in Fig. 3 but if a jam should occur the roller 196 upon coming in contact with the screw 206 and the rocker end 195 would merely swing the section 193a of the rocker leaving the section 193b to which the link 199 is connected free to stand in its position caused by locking of the gate.

Should a jam thus occur in the disposal of the trimmed plates and scraps the machine would, of course, have to be shut down until it was cleared and I provide automatic means for this purpose comprising an electric switch 210 secured to the frame side 22 below the rocker member and connected in any suitable fashion to control the motor 42 running the punch and associated parts of the machine. The switch 210 will of course normally close the circuit to the motor 42 but it will be actuated to open the circuit upon the aforesaid spreading movement of the rocker sections 193—193b just described. For this purpose there is provided an arm 211 pivoted at 212 to the rocker section 193a and connected to a plunger 213 slidably supported and toward the actuating button 214 of the switch. Normally the plunger 213 clears the switch button 214 and is held in such position by the engagement of an abutment 215 on the arm with an upper inner corner of the rocker section 193b. Should however the rocker section 193a move away from the section 193b this abutment 215 clears the said corner portion and a coil spring 216 connected to the arm 211 is then enabled to pull the arm downwardly and thrust the plunger 213 against the switch button to shut off the machine.

While it is believed that the operation of the machine will be readily understood from the foregoing it will be briefly described at this point, particularly in order to bring out the timed relation of the several operations. Assuming the punch to be in its normal inoperative position withdrawn from the die, the strippers 101 to be in their raised positions and a number of grid plates to have been accumulated at the feed point, the operation of the machine will cause the punch to move toward the die, and at the same time cause the strippers 101 to move downward stripping off one grid plate and dropping it between the punch and die. The punch will then pick up this grid plate and strike it against the ejector plate 62 to straighten the grids and as this movement of the punch is completed the grid plate will be trimmed. Immediately, then the punch starts its return stroke and the strippers start back up to positions for stripping off the next plate. As the punch moves back through the stripper plate 180 the trimmed off frame of scrap is stripped from the punch and falls down through the chute 186. At this time the gate 187 is in the dotted line position of Fig. 3, having been moved thereto by the punch on its forward, working stroke, and the stripped off scrap may then drop clear, past the gate and into a pit below the machine for periodic removal and remelting.

As the punch completes its return stroke, and after the scrap has dropped clear, the gate 187 is moved to its full line position (Fig. 3) and immediately then the rods 84 are pulled back by the punch causing the ejector plate 62 to eject the trimmed plate from the die. This trimmed plate then falls through the chute 186, and is guided by the gate 187 and plate 190 onto the conveyor 191 which carries it away from the machine, past an inspection point (not shown).

The foregoing completes one cycle of operation of the machine and the machine then carries on in similar manner as long as operated. It will be apparent that the feeding, punching, and scrap and plate separation operations are all carried out in positively and mechanically timed relation and that the machine may thus operate rapidly with little likelihood of jamming or otherwise becoming inoperative.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A machine of the character described for trimming off the marginal frame-like waste material from a rough cast grid plate, comprising a die, a punch supported for movement in a horizontal plane toward and away from the die, a stripper member located in the path of the punch and having an opening to clear the punch as it moves toward the die, means for feeding rough cast plates one at a time to a hanging position between the die and the said stripper member, and the said punch being adapted to force the plate into the die and to carry the trimmed off frame-like scrap material away from the die into engagement with the stripper member whereby said member will strip the scrap off the punch.

2. In a battery grid plate trimming machine, a die having an opening, a punch supported for movement toward and away from the die and adapted to enter the opening in the die and trim off the margin of the plate, an ejector member positioned in the opening in the die in the path of the punch, and frictionally retarded means for moving said ejector member at the completion of each trimming operation for ejecting trimmed plates from the die.

3. In a machine of the character described for trimming off the margin of a battery grid plate, a die having an opening, a punch mounted for movement toward and away from the die and adapted to enter said opening with a shearing engagement with the margins thereof, means for supporting a plate over the face of the die, an ejector member movably positioned in the opening in the die and normally projecting therefrom whereby the movement of the punch toward the die will force the plate against the ejector member and into the opening in the die, means operative in timed relation to the movement of the punch for moving the ejector member outwardly from the die and ejecting the trimmed plate from the die opening, and means operative to frictionally retard the movement of the ejector plate whereby the punch may strike the grid plate against said ejector plate with a force sufficient to straighten the plate before it is trimmed.

4. In a machine of the character described for trimming off the margin of a battery grid plate, a die having an opening, a punch mounted for movement toward and away from the die and adapted to enter said opening with a shearing engagement with the margins thereof, means for supporting a plate over the face of the die, an ejector member movably positioned in the opening in the die and normally projecting therefrom whereby the movement of the punch toward the die will force the plate against the ejector member and into the opening in the die, means operative in timed relation to the movement of the punch for moving the ejector member outwardly from the die and ejecting the trimmed plate from the die opening, a slide member supporting the said ejector plate, and means engaging a portion of the slide member and operative to frictionally retard the movement of the ejector slide whereby the punch may strike the grid plate against said ejector plate with a force sufficient to straighten the plate before it is trimmed.

5. A machine of the character described for trimming away the margin of a storage battery grid plate having lugs extending from opposite edges, comprising a die having a die face, a punch movable toward and away from the die face, hanger members upon the die for engaging the lugs of a plate and supporting the plate over the die face until the plate is trimmed, the said die having an opening adapted to be entered by the punch with a shearing action whereby the trimmed plate will be forced into the die while the scrap material remains around the punch and is drawn off the hanger members as the punch moves away from the die, and means for stripping off the waste material from the punch as the lugs on the waste material trimmed off from the plate clear said hanger members.

6. A machine of the character described for trimming the margin from about a rough cast grid plate of the type having oppositely extending marginal lugs and having openings in its waste margin material, comprising a die having an upright face and an opening therein, a punch supported for movement toward and away from the die and adapted to enter said die opening, hanger members positioned adjacent the die and adapted to engage and support each plate by its lugs in a depending position over the face of the die, registering pins extending from the punch and adapted to enter the said openings in the grid plate and to thereby accurately register the plate with the die opening, the said pins having tapered extremities adapted to enter and center themselves in the said openings, the said pins having also straight portions of a diameter such as to tightly fit the said openings and to thereby draw the trimmed off waste material away from the die as the punch moves away therefrom, and means for stripping the waste material off the punch.

7. In a battery grid plate trimming machine, a die having a die opening and a punch movable toward and away from the die and into the die opening for trimming a grid plate supported thereover, the improvement which comprises a movably mounted ejector member positioned in the opening and movable therein by contact of a grid plate driven by the punch, means actuated by the punch as it moves away from the die for moving the ejector member in the same direction and ejecting the trimmed plate from the die opening, and cooperating friction producing elements for frictionally retarding the movements of the ejector member.

8. In a battery grid plate trimming machine, a die having a die opening and a punch movable toward and away from the die and into the die opening for trimming a grid plate supported thereover, the improvement which comprises a movably mounted ejector member positioned in the opening and movable therein by contact of a grid plate driven by the punch, means actuated by the punch as it moves away from the die for moving the ejector member in the same direction and ejecting the trimmed plate from the die opening, an extension from the ejector member, and a spring urged friction device engaging a part of the extension for frictionally retarding the movements of the ejector member.

9. In a grid plate trimming machine, the combination with a die and a power operated punch cooperating to trim off certain parts of battery grid plates and means for delivering the trimmed plates and trimmed off parts thereof along a common path, of a movable gate member positioned adjacent said path and mechanically operative to positions for separating the trimmed plates from the trimmed off parts and directing them along separate paths, and means operative in response to the occurrence of a jam at the gate member for shutting off the power to the punch.

10. In a grid plate trimming machine, the combination with a die and a power operated punch cooperating to trim off certain parts of battery grid plates and means for delivering the trimmed plates and trimmed off parts thereof along a common path, of a movable gate member positioned adjacent the said path and movable sequentially to and between positions for separating the trimmed plates from the trimmed off parts and directing them along separate paths, means for so positioning the gate member, and said positioning means including elements releasable should a jam occur at the gate member and operative upon release to shut off the power to the punch.

11. In a grid plate trimming machine, the combination with a die and a power operated punch cooperating to trim off certain parts of battery grid plates and means for delivering the trimmed plates and trimmed off parts thereof along a common path, of a movable gate member positioned adjacent the said path and movable sequentially to and between positions for separating the trimmed plates from the trimmed off parts and directing them along separate paths, means for so positioning the gate member, said means including a two part rocker element connected to the gate member, means normally connecting the rocker parts to operate as a unit but releasable should a jam occur at the gate member to permit one part to move independently of the gate member, and means operative by each independent movement of the one part to shut off the power to the punch.

12. In a grid plate trimming machine, the combination with a die and a power operated punch cooperating to trim off certain parts of battery grid plates and means for delivering the trimmed plates and trimmed off parts thereof along a common path, of a movable gate member positioned adjacent the said path and movable sequentially to and between positions for separating the trimmed plates from the trimmed off parts and directing them along separate paths, means for so positioning the gate member, said means including a two part rocker member having relatively swingable parts yieldably held together to operate as a unit, means for rocking the rocker member, means connecting one part of the rocker member to the gate for swinging the same responsive to said rocking movement, and means operative by the other part of the rocker member for shutting off power to the punch should a jam occur at the gate.

13. In a grid plate trimming machine for trimming off certain parts of battery grid plates and having cooperating punch and die elements, a power operated reciprocating part operating the punch, a swingably supported gate operative to and between two positions to separate the trimmed plates from the trimmed off parts thereof, means for swinging the gate comprising a rocker having two relatively movable parts and means normally and yieldably restraining the parts to rock as a unit, the rocker parts being forked and having spaced end portions, actuating means on the punch reciprocating part movable between said end portions and as the punch reciprocates alternately engaging those portions to swing the rocker in opposite directions, means connecting one of the rocker parts to the gate for swinging the same, and means operative by the other rocker part upon movement thereof independent of the gate due to the occurrence of a jam thereat for stopping the punch.

14. A machine of the character described for trimming marginal waste material from grid plates, comprising a die having a die opening, a punch supported for movement toward and away from the die and to enter said die opening and trim off the margin of a plate, a stripper member located in the path of the punch and having an opening to clear the punch as it moves, means for feeding plates one at a time to a hanging position over the die opening and between the die and stripper member, the punch being adapted to force the plate into the die opening and then to carry the trmmed off marginal waste away from the die into engagement with the stripper member whereby said member will strip off this waste, an ejector member positioned in the die opening in the path of the punch, and frictionally retarded means for moving the ejector member at the completion of each trimming operation for ejecting trimmed plates from the die opening.

15. In a machine for trimming off marginal scrap from battery plates, a cooperating punch and die for trimming the plates and means associated therewith for first dropping the scrap and then the trimmed plates in parallel vertical paths at the completion of each operation, a gate swingably supported at one side of said paths and normally hanging in a position clearing these paths whereby the scrap may fall free from the machine, and means operated by the punch for then swinging the gate to an angular position across said paths as the trimmed plate falls to thereby guide the said plate away from the path followed by the scrap.

ARTHUR D. LUND.

REFERENCES CITED

The following references are of record in the file of this patent:

UNITED STATES PATENTS

| Number | Name | Date |
|---|---|---|
| 250,996 | Stiles | Dec. 13, 1881 |
| 337,129 | Caldwell | Mar. 2, 1886 |
| 444,917 | Mason | Jan. 20, 1891 |
| 517,171 | Saltzkorn | Mar. 27, 1894 |
| 1,504,182 | Carter | Aug. 5, 1924 |
| 1,608,836 | Bryce | Nov. 30, 1926 |
| 1,669,164 | Holman | May 8, 1928 |
| 2,009,869 | Beekman | July 30, 1935 |
| 2,252,280 | Lormor | Aug. 19, 1941 |
| 2,322,351 | Feldtkeller | June 22, 1943 |
| 2,375,717 | Winkel | May 8, 1945 |